United States Patent
Wada

[11] Patent Number: 6,116,735
[45] Date of Patent: Sep. 12, 2000

[54] CONTACT LENS

[75] Inventor: Osamu Wada, Nagano, Japan

[73] Assignee: Seiko Epson Corporation, Nagano-Ken, Japan

[21] Appl. No.: 09/258,862

[22] Filed: Feb. 26, 1999

Related U.S. Application Data

[63] Continuation of application No. PCT/JP98/03136, Jul. 14, 1998.

[30] Foreign Application Priority Data

Jul. 14, 1997 [JP] Japan ............................... 188678/1997

[51] Int. Cl.$^7$ ....................................................... G02C 7/04
[52] U.S. Cl. ................................................................ 351/161
[58] Field of Search ................................. 351/161, 160 R, 351/160 H, 162; 623/6, 6.23–6.24, 6.27–6.28

[56] References Cited

U.S. PATENT DOCUMENTS

| Re. 34,251 | 5/1993 | Achatz et al. | 623/6 |
| 4,636,049 | 1/1987 | Blaker | 351/161 |
| 4,890,913 | 1/1990 | DeCarle | 351/161 |
| 4,976,534 | 12/1990 | Miege et al. | 351/161 |
| 5,056,908 | 10/1991 | Cohen | 351/161 |
| 5,096,285 | 3/1992 | Silberman | 351/161 |
| 5,106,180 | 4/1992 | Marie et al. | 351/161 |
| 5,158,572 | 10/1992 | Nielsen | 351/161 |
| 5,229,797 | 7/1993 | Futhey et al. | 351/161 |
| 5,541,678 | 7/1996 | Awanohara et al. | 351/161 |
| 5,682,223 | 10/1997 | Menezes et al. | 351/161 |
| 5,798,817 | 8/1998 | DeCarle | 351/161 |

FOREIGN PATENT DOCUMENTS

| 0445994 | 9/1991 | European Pat. Off. |
| 0457553 | 11/1991 | European Pat. Off. |
| 60-91327 | 5/1985 | Japan |
| 1154119 | 6/1989 | Japan |
| 2240625 | 9/1990 | Japan |
| 3244450 | 10/1991 | Japan |
| 4254817 | 9/1992 | Japan |
| 7239459 | 9/1995 | Japan |
| 9118107 | 11/1991 | WIPO |

OTHER PUBLICATIONS

Patent Abstracts of Japan of JP 07239459 of Sep. 1995.

"Roshi–yo Kontakuto Renzu" (Contact Lens for Presbyopia) vol. 12, No. 10, 1995 pp. 1543–1544 "Topics and Fitting Techniques".

Patent Abstract of Japan of JP 3,244,450 of Oct. 1991.

*Primary Examiner*—Georgia Epps
*Assistant Examiner*—Jordan M. Schwartz
*Attorney, Agent, or Firm*—Ladas & Parry

[57] ABSTRACT

The present invention provides a multifocal contact lens capable of giving high vision regardless of unavoidable, unignorable phenomena including lens decentering and the variation of the diameter of the pupil of a person wearing the multifocal contact lens. In a contact lens (1) having a lens curve (2) having an optical zone (7) consisting of near-vision zones for near vision and distance-vision zones for distance vision arranged alternately, concentrically and coaxially with an optical axis (10), the near-vision zones and the distance-vision zones are only a first near-vision zone (N1) including the optical axis (10), a first distance-vision zone (F1) surrounding and contiguous with the first near-vision zone (N1), a second near-vision zone (N2) surrounding and contiguous with the first distance-vision zone (F1), and a second distance-vision zone (F2) surrounding and contiguous with the second near-vision zone (N2).

1 Claim, 9 Drawing Sheets

N/F DESIGN

N/F DESIGN

CONTACT LENS

This application is a continuation of copending application International Application PCT/JP98/03136 filed on Jul. 14 1998 and which designated the U.S., claims the benefit thereof and incorportaes the same by reference.

TECHNICAL FIELD

The present invention relates to a contact lens having a lens curve consisting of distance-vision zones for distance vision and near-vision zones for near vision arranged alternately, concentrically and coaxially with the optical axis thereof.

BACKGROUND ART

A bifocal contact lens having a circular near-vision zone formed in its central region coaxially with its optical axis, and an annular distance-vision zone formed around and concentric with the near-vision zone is proposed in, for example, JP-A No. 60-91327.

Referring to FIG. 12, a contact lens 1 has a front surface consisting of a near-vision zone N for near vision and a distance-vision zone F for distance vision, and a base surface 3 corresponding to the curved surface of the wearer's cornea. When the lens is fitted over a central part of the cornea of the eye, the near-vision zone covers substantially half the pupil of the eye under an average reading light condition about 80 ft (about 24.4 m) candle (80 ft-candle) by definition.

A person wearing a contact lens meeting such a condition is able to use a distance-vision zone and a near-vision zone appropriately and smoothly by using the distance-vision zone and the near-vision zone intentionally selectively. However, the optical center of the contact lens specified for the person often does not- coincide with the center of the person's pupil, which makes the appropriate selective use of the distance-vision zone and the near-vision zone difficult. A multifocal contact lens has been proposed, for example, in JP-A No. 7-239459 to solve such a problem.

FIG. 13 shows a contact lens 1 having a front surface 2 consisting of a near-vision zone N and a distance-vision zone F, and a base surface 3 corresponding to the curved surface of the wearer's cornea. This contact lens is a multifocal lens having a near-vision zone (of a diameter in the range of 0.8 to 3.5 mm) including an optical axis and decentered toward the nose by a distance in the range of 0.2 to 2.4 mm from a vertical longitude passing the geometrical center of the contact lens. This contact lens 1 is provided with a prism ballast and a peripheral part thereof is slabbed off to prevent the contact lens 1 from turning and to position the same correctly on the eye. When the contact lens 1 shown in FIG. 13 is fitted over the eye, the contact lens 1 can be positioned with the optical axis passing the center of the near-vision zone substantially coincided with the center of the pupil of the eye.

Multifocal contact lenses capable of preventing spherical aberration are disclosed in, for example, JPA- No. 5-508019 and its U.S. counterpart 5,541,578.

These prior art multifocal contact lenses have an alternate concentric arrangement of distance-vision zones and near-vision zones.

A contact lens 1 shown in FIG. 14, one of those lenses, has a front surface having an alternate, concentric arrangement of distance-vision zones F1. F2 . . . for distance vision, and near-vision zones N1, N2, . . . for near vision. In this lens, the distance-vision zones F1, F2, . . . are arranged so that light rays parallel to the optical axis of the lens 1 and falling on the distance-vision zones F1, F2, . . . may be focused substantially on the same point on the optical axis.

A concentric progressively variable power multifocal contact lens is proposed in, for example, Hisao Magariya, "Roshi-yo Kontakuto Renzu (Contact Lens for Presbyopia)", Atarashii Ganka 10, pp. 1543–1544 (1995).

A contact lens 1 shown in FIG. 15 has a front surface 2 having a single spherical surface, and a base surface 3 having the shape of an inside hyperbolic aspherical surface. A central region of the base surface 3 has a shape for distance vision, and power for near vision increases progressively from a middle region toward a peripheral region. Since the base surface 3 flattens sharply from the apex toward the edge thereof, the curvature of a region around the apex of the base surface 3 is greater than that corresponding to the radius of curvature of the cornea.

There are various contact lenses having both near-vision zones and distance-vision zones as those mentioned above.

Practical contact lenses must meet the following practical requirements. However, the prior art contact lenses do not necessarily meet those requirements satisfactorily.

A contact lens fitted over the cornea repeats horizontal and vertical motions (hereinafter referred to as "decentering motions") stopping at a stabilizing position, and turning on the cornea (hereinafter referred to as "turning motions") every time the wearer blinks.

These motions including the decentering motions of the contact lens on the eye contribute to discharging body wastes collected between the contact lens and the cornea outside together with tears and supplying oxygen to the cells of the cornea together with tears. Thus, the motions of the contact lens on the eye provides important physiological functions.

The decentering motion dislocates the center of the contact lens from a position corresponding to the center of the pupil. The decentering motion is not any significant problem for a single-focus contact lens. Since the multifocal contact lens has an alternate arrangement of annular near-vision zones and annular distance-vision zones, decentering motions are impediments to providing a clear vision.

However, there has been no direct mention on how the positional relation between the distance-vision zones and the near-vision zones of a multifocal contact lens must be to give high vision regardless of decentering motions.

The size, i.e., the diameter, of the pupil of the eye of a man wearing a contact lens varies autonomically according to the brightness of the ambiance for important physiological functions.

Since a multifocal contact lens has an alternate arrangement of annular near-vision zones and annular distance-vision zones, the distribution ratio between the near-vision zones and the distance-vision zones in the pupil varies with the variation of the diameter of the pupil and, consequently, the distribution ratio between distance-vision performance and near-vision performance of the contact lens varies according to the brightness of the ambiance.

The variation of the diameter of the pupil, together with decentering motions, causes the more complex variation of the distribution ratio between the near-vision zones and the distance-vision zones in the pupil.

However, there has been no direct mention on how the positional relation between the distance-vision zones and the near-vision zones of a multifocal contact lens must be to give high vision regardless of the variation of the diameter of the pupil.

SUMMARY OF THE INVENTION

Accordingly, it is an object of the present invention to solve those problems in the prior art and to provide a multifocal contact lens capable of giving high vision correction regardless of unavoidable, unignorable phenomena including lens decentering and the variation of the diameter of the pupil of a person wearing the multifocal contact lens.

With the foregoing object in view, the inventors of the present invention made earnest studies of requirements required of contact lenses to give high vision correction regardless of the physiological phenomena in the eye including decentering motions and the variation of the diameter of the pupil, and have made the present invention on the basis of findings acquired through the studies.

According to a first aspect of the present invention, a contact lens has a lens curve having an optical zone consisting of two near-vision zones for near vision and two distance-vision zones for distance vision arranged alternately, concentrically and coaxially around an optical axis, in which the two near-vision zones are first and second near-vision zones, and the two distance-vision zones are first and second distance-vision zones.

According to a second aspect of the present invention, a contact lens has a lens curve having an optical zone consisting of near-vision zones for near vision and distance-vision zones for distance vision arranged alternately, concentrically and coaxially with an optical axis, in which the near-vision zones and the distance-vision zones forming the optical zone of the lens curve are a first near-vision zone including the optical axis, a first distance-vision zone surrounding and contiguous with the first near-vision zone, a second near-vision zone surrounding and contiguous with the first distance-vision zone, and a second distance-vision zone surrounding and contiguous with the second near-vision zone.

Preferably, the first near-vision zone is a curve surrounded by a circle of a radius in the range of about 0.5 to about 1.0 mm having its center on the optical axis. The curve surrounded by a circle of a radius in the range of about 0.5 to about 1.0 mm having its center on the optical axis is a curve surrounded by projections formed by projecting a circle of about 0.5 mm or above in radius and a circle of about 1.0 mm or below in radius formed on a plane perpendicular to the optical axis in parallel to the optical axis. This definition of the curve surrounded by the circle applies to curves which will be mentioned below.

Preferably, the first near-vision zone is a curve surrounded by a circle of a radius in the range of about 0.5 mm to about 1.0 mm having its center on the optical axis, the radius is nearer to 0.5 mm for larger addition powers, and is nearer to 1.0 mm for smaller addition powers.

Preferably, the second near-vision zone has a surface area five times that of the first near-vision zone or greater.

According to a third aspect of the present invention, a contact lens has a lens surface having an optical zone consisting of near-vision zones for near vision and distance-vision zones for distance vision arranged alternately, concentrically and coaxially with an optical axis; in which the near-vision zones and the distance-vision zones forming the optical zone of the lens curve are only a first near-vision zone including the optical axis, a first distance-vision zone surrounding and contiguous with the first near-vision zone, a second near-vision zone surrounding and contiguous with the first distance-vision zone, and a second distance-vision zone surrounding and contiguous with the second near-vision zone; the first near-vision zone is surrounded by a circle of a radius in the range of abut 0.5 to 1.0 mm having its center on the optical axis; and the second near-vision zone has a surface area five times that of the first near-vision zone or above.

According to the present invention, the respective numbers of the near-vision zones and the distance-vision zones are determined properly on the basis of the results of investigation into decentering motions of human eyes and the variation of the diameter of the pupil.

Order of arrangement of the near-vision zones and the distance-vision zones is specified so that interference between images formed by the near-vision zones and those formed by the distance-vision zones, and the radius of the circle surrounding the first near-vision zone formed in a central region including the optical axis is specified.

The term "interference" does not signify the interference between light waves of different phases, and is used to signify the superposition of noise light rays that do not contribute to image formation on light rays contributing to image formation on an image forming plane (Japanese Patent Application No. 9-78604). The term "interference" will be used for signifying such a phenomenon in the following description.

According to the present invention, since the contact lens has the lens curve having the optical zone consisting of the two near-vision zones, i.e., the first and the second near-vision zones, for near vision and the two distance-vision zones, i.e., the first and the second distance-vision zone, for distance vision arranged alternately, concentrically and coaxially around the optical axis, the contact lens is able to give very stable, high vision correction under contact lens wearing conditions in which decentering motions occur and the diameter of the pupil varies.

According to the present invention, since the near-vision zones and the distance-vision zones are the first near-vision zone including the optical axis, the first distance-vision zone surrounding and contiguous with the first near-vision zone, the second near-vision zone surrounding and contiguous with the first distance-vision zone, and the second distance-vision zone surrounding and contiguous with the second near-vision zone, and the near-vision zone is formed in a central region including the optical axis, the contact lens is able to give very stable, high vision under contact lens wearing condition in which decentering motions occur and the diameter of the pupil varies, and interference between images can be prevented when viewing a near object.

DETAILED DESCRIPTION OF A BEST MODE FOR CARRYING OUT THE INVENTION

Preferred embodiments of the present invention will be described hereinafter with reference to the accompanying drawings.

First, a preferred embodiment of the present invention will be described.

Figure 1:
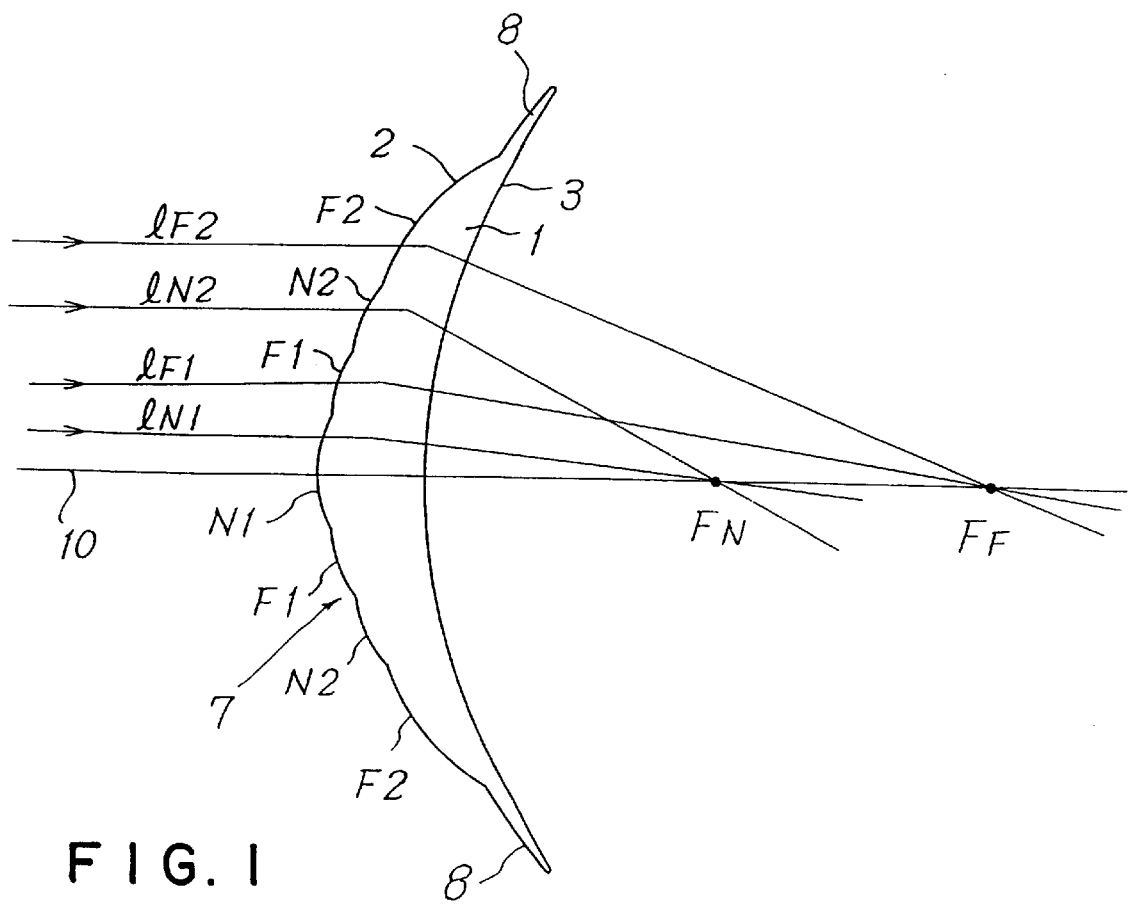
FIG. 1 is a sectional view of a contact lens in a preferred embodiment according to the present invention.

Referring to FIG. 1, a contact lens 1 has a front surface 2 not coming into contact with the eye when the contact lens 1 is fitted over the eye, and a back or base surface 3 to be in contact with the eye when the contact lens 1 is fitted over the eye. The front surface has an optical zone 7 defining a field of view and consisting of a circular refractive first near-vision zone N1 including an optical axis 10, an annular refractive first distance-vision zone F1 surrounding and contiguous with the first near-vision zone N1, an annular refractive second near-vision zone N2 surrounding and contiguous with the first distance-vision zone F1, and annular refractive second distance-vision zone F2 surrounding and contiguous with the second near-vision zone N2. The thickness of a peripheral part of the contact lens 1 is reduced to form a carrier portion 8 by which the contact lens 1 is held when fitting the contact lens 1 over the eye.

The contact lens 1 embodying the present invention shown in FIG. 1 has the first near-vision zone N1 in a central region thereof including the optical axis 10, and the first distance-vision zone F1, the second near-vision zone N2 and the second distance-vision zone F2 are formed in that order around the first near-vision zone N1. Only the two near-vision zones N1 and N2 and the two distance-vision zones F1 and F2 are formed in the optical zone of the front surface 2.

The first near-vision zone N1 is a curve surrounded by a circle of a radius in the range of about 0.5 to about 1.0 mm.

The effective surface area of the second near-vision zone N2 is about five times or more than that of the first near-vision zone N1.

Figure 2:
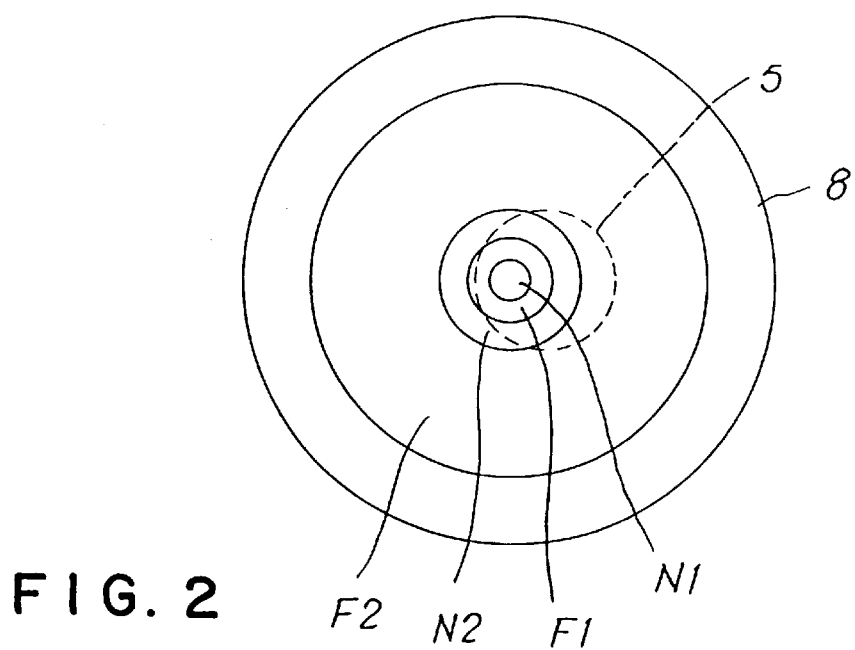
FIG. 2 is a plan view showing the relation between the contact lens in the preferred embodiment and the pupil.

Design dimensions of the contact lens 1 shown in FIG. 1 will concretely be described with reference to FIG. 2 showing the contact lens 1 in a plan view. The fist near-vision zone N1 is 0.625 mm in radius and 0.625 mm in zone width, the first distance-vision zone F1 is 1.25 mm in radius and 0.625 mm in zone width, the second near-vision zone N2 is 1.875 mm in radius and 0.625 mm in zone width, and the second distance-vision zone F2 is 5.25 mm in radius and 3.375 mm in zone width. The diameter of the optical zone, i.e., the outside diameter of the second distance-vision zone F2, is 10.5 mm. The outside diameter of the peripheral region 8 surrounding the optical zone 7 is 13.8 mm. It is assumed, for reasons which will be explained later, that the diameter of a standard pupil is 3.8 mm, and the lens eccentricity is 0.8 mm.

The capability of the contact lens 1 shown in FIG. 1 to give stable, high vision regardless of lens eccentricity and the variation of the diameter of the pupil will be described hereinafter in connection with collected data.

Advantageous properties of the contact lens 1 shown in FIG. 1 in near vision and dark vision will be described with reference to FIGS. 3 and 4.

First, advantageous properties of the contact lens 1 shown in FIG. 1 in near vision will be described.

Figure 3:
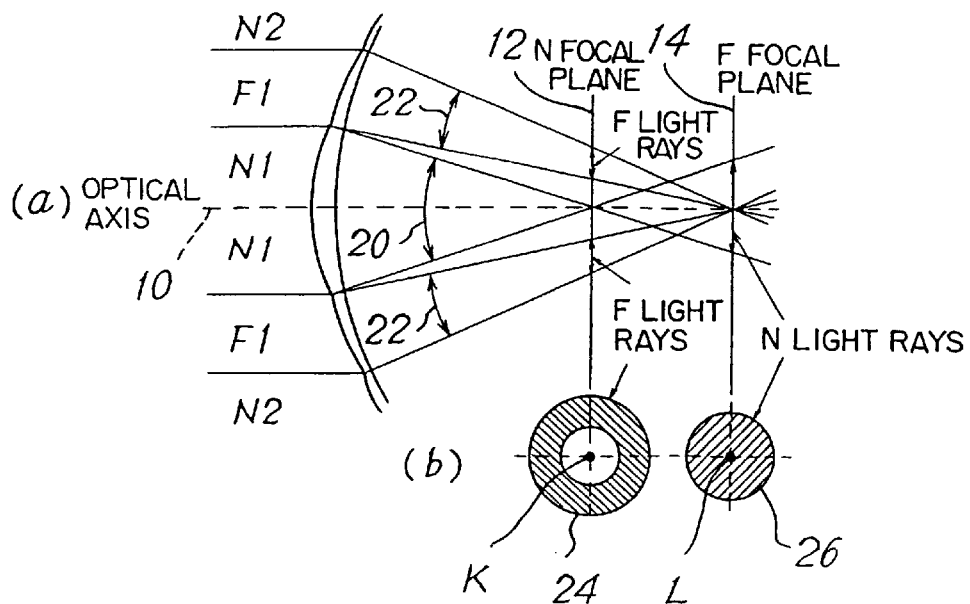
FIG. 3 is a diagrammatic view of assistance in explaining interference between images formed by a near-vision zone formed in a central region including an optical axis and a distance-vision zone.

The contact lens 1 shown in FIG. 1 is capable of forming a clear image because the contact lens 1 has the near-vision zone N1 in the central region thereof including the optical axis 10 as shown in FIG. 3.

As shown in FIG. 3, the near-vision zone N1 is formed in the central region and the distance-vision zone F1 is formed so as to surround the near-vision zone N1. Parallel light rays 20 traveling through the near-vision zone are focused on a focal plane 12, and parallel light rays 22 traveling through the distance-vision zone are focused on a focal plate 14.

Suppose that an object point J, not shown, lies at a point at infinity from the front surface 2, an image of the object point J is formed by the near-vision zone N1 at an image point K, and an image of the object point J is formed by the second curve at an image point L. The light rays 20 traveled through the near-vision zone N1 are focused at the image point K on a focal plane 12, diverge from the image point K, and fall on a focal plane 14. The light rays traveled through the distance-vision zone F1 are focused in an annular image at the image point L on the focal plane 14.

As is obvious from FIG. 3(b), the image point K at which the image is formed by the near-vision zone N1 is surrounded by an annular ring 24 of the light rays 22 passed through the distancevision zone F1 on the focal plane 12, and the image point K is not covered with the annular ring 24. Thus, the image formed by the near-vision zone N1 at the image point K is not interfered with by the light rays traveled through the distance-vision zone F1 on the focal plane 12.

A circular image 26 of background light formed by the light rays 20 traveled through the near-vision zone N1 overlaps the image formed at the image point L on the focal plane 14 by the distance-vision zone F1. Thus, the image formed at the image point L on the focal plane 14 by the distance-vision zone F1 is interfered with by the light rays traveled through the near-vision zone N1.

When the contact lens illustrated in FIG. 3 is used, the image formed by the near-vision zone N1 on the focal plane 12 is not interfered with by the light rays traveled through the distance-vision zone F1, and the image formed at the image point L by the distancevision zone F1 is interfered with by the light rays traveled through the near-vision zone N1.

Figure 4:
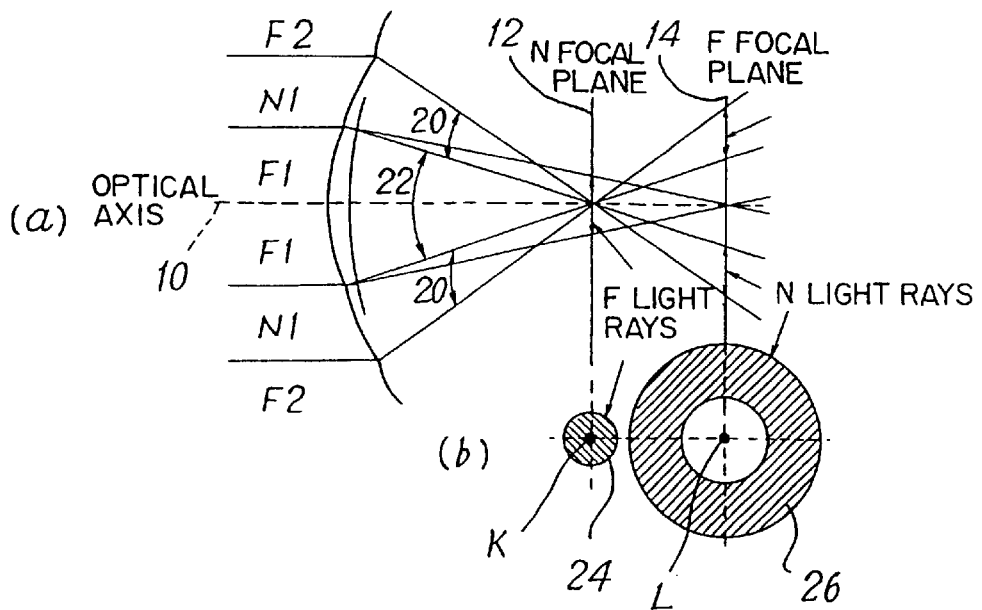
FIG. 4 is a diagrammatic view of assistance in explaining interference between images formed by a near-vision zone formed in a central region including an optical axis and a distance-vision zone.

When a contact lens shown in FIG. 4 different from the contact lens in accordance with the present invention and having a distance-vision zone F1 in a central region thereof is used, an image formed by a near-vision zone N1 on a focal plane 12 is interfered with by light rays traveled through the distance-vision zone F1, and an image formed at an image point L by the distance-vision zone F1 is not interfered with by light rays traveled through the near-vision zone N1.

As is apparent from the description made in connection with FIG. 3, "interference" does not occur in near vision and an image clearer than that formed by distance vision is formed because the contact lens 1 shown in FIG. 1 has the near-vision zone N1 in the central region including the optical axis 10.

Advantageous properties of the contact lens 1 shown in FIG. 1 in dark vision will be described.

A person watches remote objects in a dark environment when watching a movie, projected slides or OHP at theaters or the like. A person watches also remote objects in a dark environment when driving an automobile or the like at night.

A person sees near objects in a bright environment illuminated by a lamp or the like when, for example, reading a book.

In dark vision, the pupil 5 dilates and remote objects are seen in many cases.

The contact lens 1 shown in FIG. 1 has the distance-vision zone F2 forming an outermost zone. Therefore, the area of a part of the distance-vision zone F2 overlapping the pupil 5 increases with the dilation of the pupil 5. Such a condition is suitable for dark vision in which it is often that remote objects are seen.

Capability of the contact lens 1 shown in FIG. 1 to give high vision in a state where the contact lens 1 is decentered will be described hereinafter.

Figure 5:
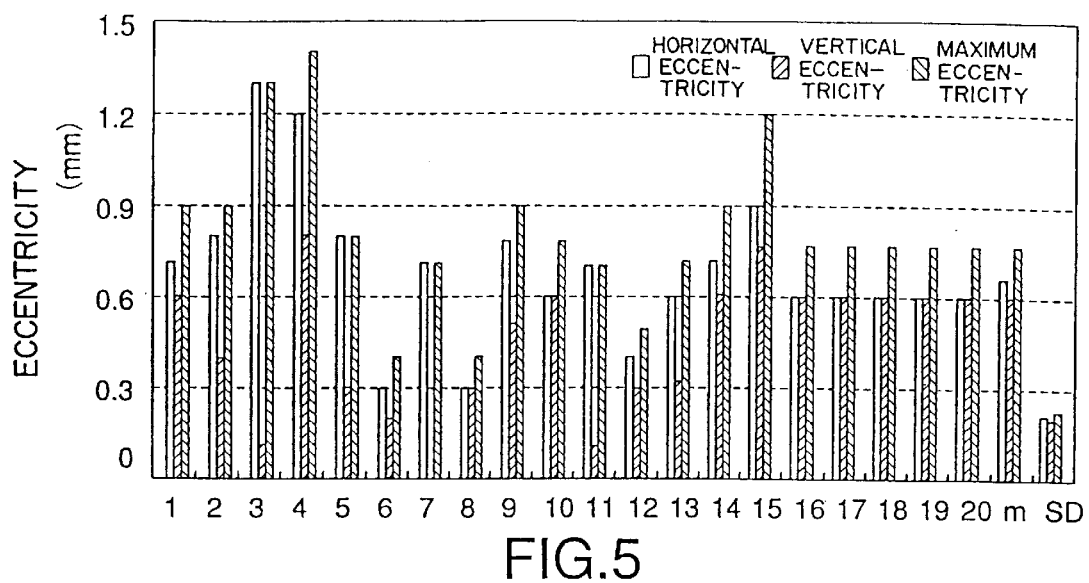
FIG. 5 is a graph showing measured horizontal, vertical and maximum eccentricities of decentered contact lenses on the eyes of twenty persons.

Eccentricities of decentered contact lenses on the twenty eyes of ten persons were measured to estimate a possible eccentricity of the contact lens. Measured results are shown in FIG. 5. It was determined from the measured data shown in FIG. 5 that the eccentricity is 0.8 mm ±0.3 mm.

Figure 6:
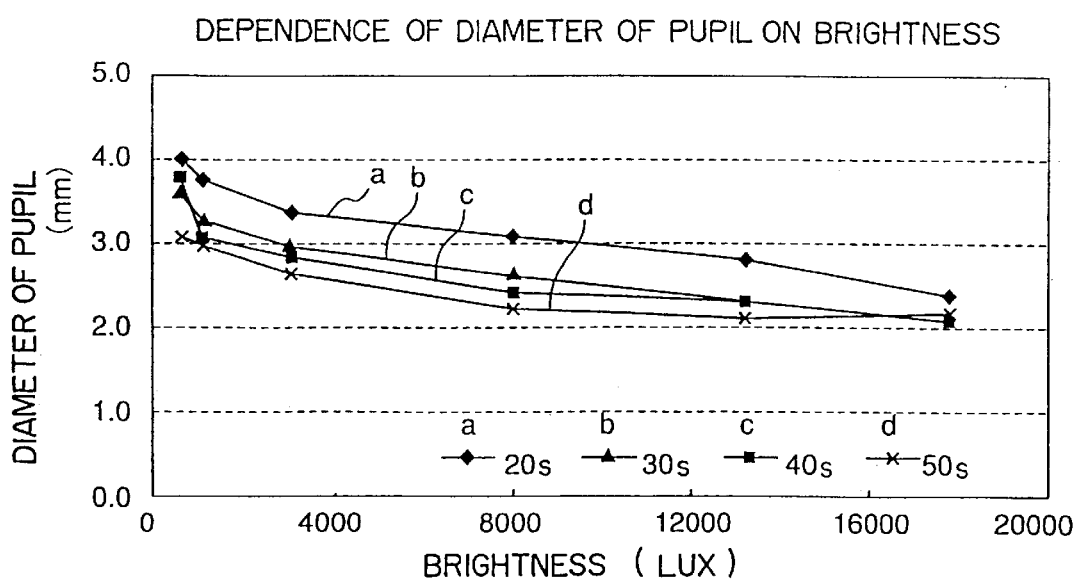
FIG. 6 is a graph showing the measured variation of the diameter of the pupil with illuminance for ages.

FIG. 6 is a graph showing the results of analysis of the dependence of the diameter of the pupil on brightness for persons in their 20s, 30s, 40s and 50s. It is known from FIG. 6 that the diameter of the pupil does not decrease below 2 mm even in the brightest ordinary environment regardless of age. In an illuminated room of an illuminance of 350±150 lx, the diameters of pupils are distributed in the range of 3 to 4 mm.

Figure 7:
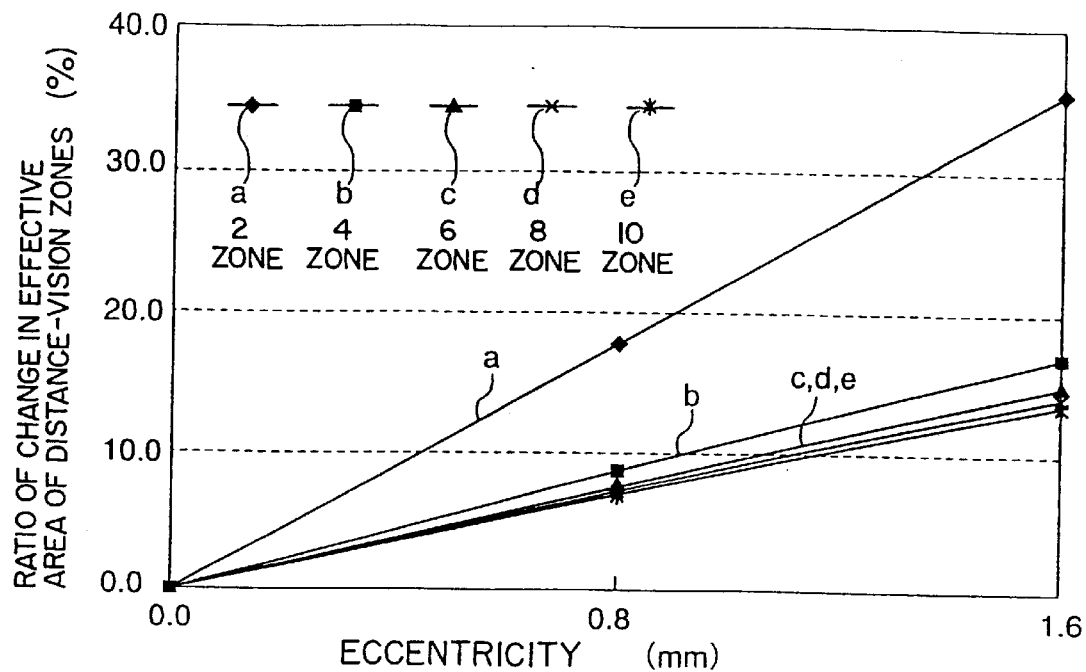
FIG. 7 is a graph showing the dependence of the ratio of variation of the effective area of distance-vision zones on the eccentricity of decentered contact lenses respectively having two, four, six, eight and ten zones.
Figure 8:
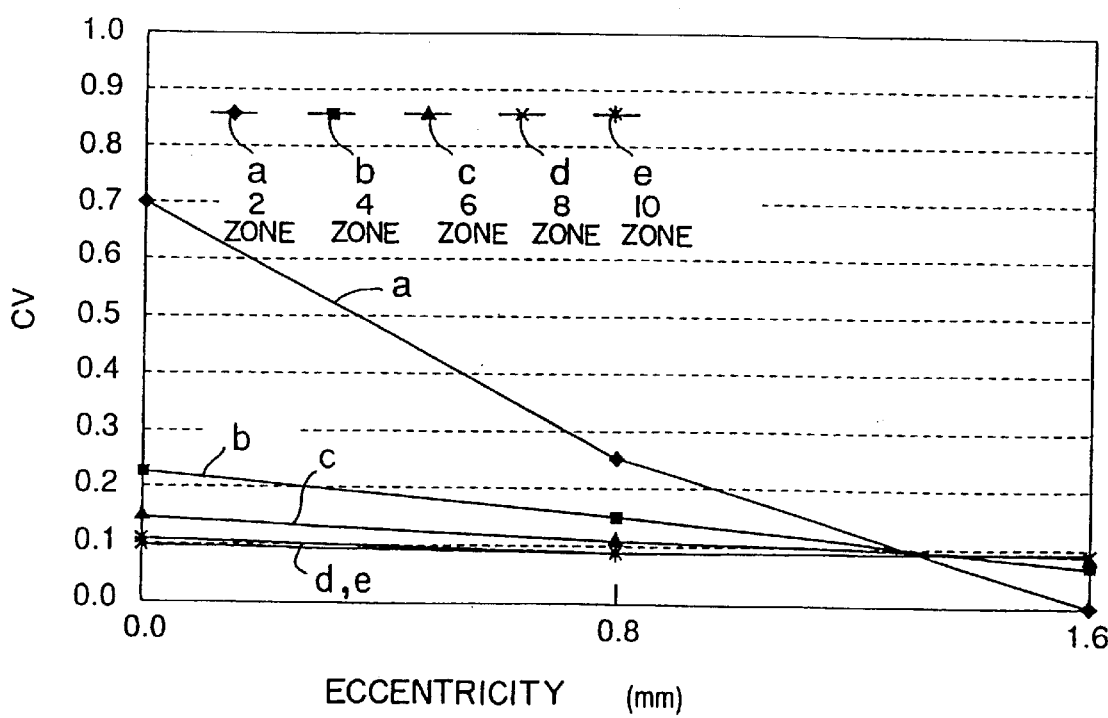
FIG. 8 is a graph showing the dependence of the coefficient of variation (CV) of the effective area of distance-vision zones when the diameter of the pupil was varied in the range of 2 mm to 5 mm on the eccentricity of contact lenses respectively having two, four, six, eight and ten zones (CV is the quotient of the division of the standard deviation of the distribution of the variation of the effective area of the distance-vision zones with the variation of the diameter of the pupil by the mean value of the distribution)

FIG. 7 shows the effect of decentering of contact lenses on the ratio of change of the effective area of distance-vision zones of contact lenses respectively having two, four, six, eight and ten zones, a near-vision zone in a central region and a distance-vision zone in a peripheral region determined by simulation. FIG. 8 shows the dependence of the coefficient of variation (CV) of the effective area of distance-vision zones when the diameter of the pupil is varied on the eccentricity of contact lenses respectively having two, four, six, eight and ten zones, a near-vision zone in a central region and a distance-vision zone in a peripheral region.

FIG. 7 shows dependence of the ratio (%) of change of the effective area of distance-vision zones on the eccentricity (mm) of decentered contact lenses. The ratio (%) of change of the effective area of the distance-vision zones covering a standard pupil of 3.8 mm in diameter, i.e., the ratio (%) of change of the effective area of the distance-vision zones through which light rays fall on the standard pupil, at three eccentricities of 0 mm, 0.8 mm and 1.6 mm selected on the basis of the measured data shown in FIG. 5 was calculated. A smaller ratio (%) of change of the effective area of the distance-vision zones ensures stabler vision when the contact lens is decentered and, therefore, it is desirable that the ratio of change of the effective area of the distance-vision zones for a change of eccentricity is small.

As is obvious from FIG. 7, the ratios of change of the effective area of the distance-vision zones of the contact lenses respectively having four zones or above vary with eccentricity far more gradually in similar modes (curves b, c, d and e) than the variation of the ratio of change of the effective area of the distance-vision zone of the contact lens having two zones (curve a).

It is decided on the basis of the data shown in FIG. 7 that a contact lens provided with four zones or above are capable of providing a stable vision regardless of the eccentricity of the contact lens and the number of the zones may be four, six, eight or ten.

FIG. 8 shows the dependence of the coefficient of variation (CV) of the effective area of distance-vision zones when the diameter of the pupil was varied in the range of 2 to 5 mm determined on the basis of the data shown in FIG. 6 on the eccentricity of contact lenses respectively having two, four, six, eight and ten zones.

The coefficient of variation (CV) is the quotient of the division of the standard deviation of the distribution of the variation of the effective area of the distance-vision zones with the variation of the diameter of the pupil by the mean value of the distribution. A smaller coefficient of variation (CV) insures stabler vision when the diameter of the pupil changes and, therefore, it is desirable that the coefficient of variation (CV) for a change of the diameter of the pupil is small.

As is obvious from FIG. 8, the coefficients of variation (CV) for the contact lenses having four zones or above vary with the diameter of the pupil far more gradually in similar modes (curves b, c, d and e) than the variation of the coefficient of variation (CV) for the contact lens having two zones (curve a).

It is decided on the basis of the data shown in FIG. 8 that a contact lens provided with four zones or above are capable of providing a stable vision regardless of the variation of the diameter of the pupil and the number of the zones may be four, six, eight or ten.

Figure 9:
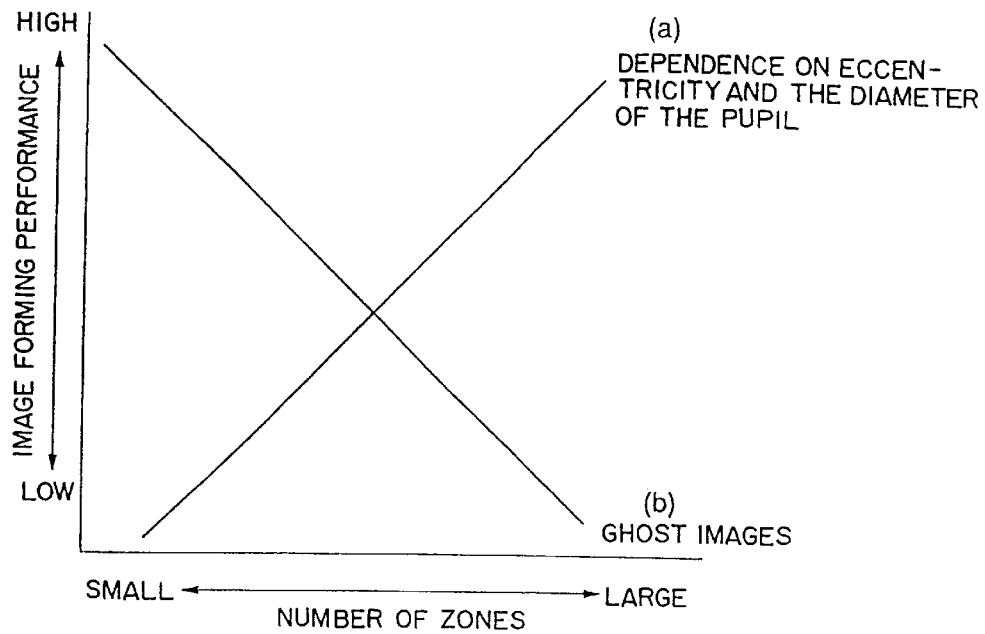
FIG. 9 is a graph showing the qualitative relation between the number of zones and image forming performance with respect to ghost image formation and the dependence of the eccentricity of contact lenses on the diameter of the pupil.

FIG. 9 shows qualitatively the relation between the number of zones and image forming performance of a contact lens.

In FIG. 9, a curve a indicates that contact lenses having a larger number of zones exercise higher image forming performance. Since the greater the number of zones, the smaller is the zone width of the near-vision zones or the distance-vision zones, the eccentricity of the contact lens or the change of the diameter of the pupil affects the changes of the respective effective areas of the near-vision zones and the distance-vision zones evenly.

In FIG. 9, a curve b indicates that the number of ghost images increases with the increase of the number of zones. Many zones form many prisms in the boundaries of the adjacent zones, and the prisms cause image jump, i.e., discontinuous transition of an image at the boundary of the adjacent zones, and the image jump produces ghost images.

It is concluded from the collective examination of the data shown in FIGS. 7, 8 and 9 that the optimum number of the zones among four, six, eight and ten is four in view of reducing the adverse effects of the decentering of the contact lens, the variation of the diameter of the pupil and formation of ghost images. According to this conclusion, the contact lens 1 shown in FIG. 1 has the optical zone 7 provided with the two near-vision zones N1 and N2 and the two distance-vision zones F1 and F2.

The relation between the respective areas of the zones of the contact lens 1 shown in FIG. 1 and the image forming performance of the same will be explained.

As mentioned above, the effective surface area of the second near-vision zone N2 is about five times or more greater than that of the first near-vision zone N1. The second near-vision zone N2 is used as a primary near-vision zone, and the first near-vision zone N1 is used as a secondary near-vision zone. Experiments proved that the dominance of the second near-vision zone N2 over the first near-vision zone N1 becomes insignificant if the surface area of the second near-vision zone N2 is less than five times that f the first near-vision zone N1.

The first distance-vision zone F1 is a primary distance-vision zone suitable for distance vision in a bright environment and a dim environment, and the second distance-vision zone F2 is a secondary distance-vision zone suitable for distance vision in a dark environment because the effective area of the second distance-vision zone F2, i.e., the area of a portion of the second distance-vision zone F2 overlapping the pupil, increases with the increase of the diameter of the pupil in a dark environment.

The contact lens is designed so that the area ratio between the near-vision zones and the distance-vision zones is approximately 1 (one) regardless of the variation of the diameter of the pupil.

Figure 10:
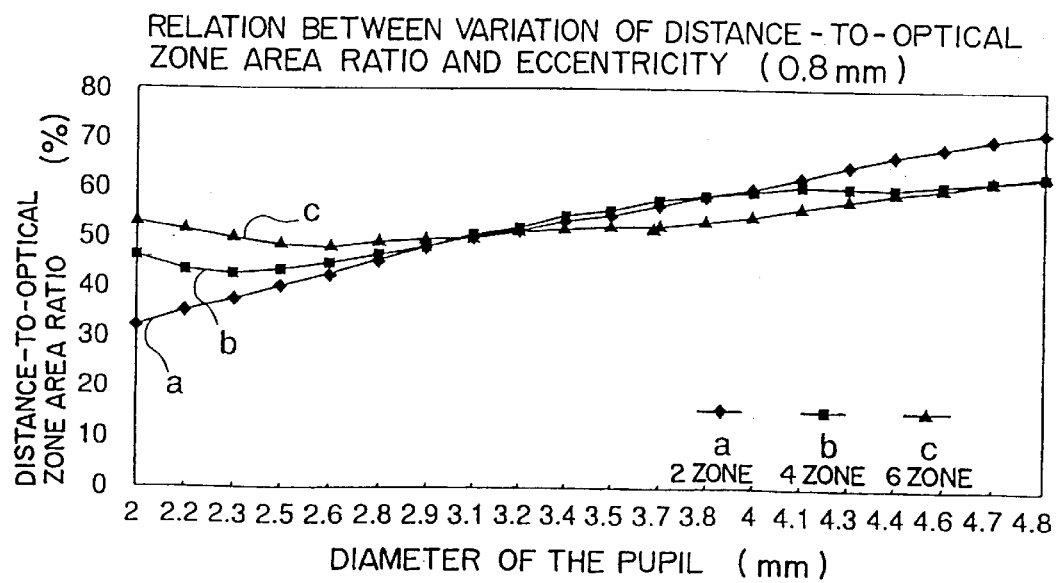
FIG. 10 is a graph showing the variation of distant-to-optic area ratio, i.e., the ratio of the area of the distance-vision zones to that of the optical zone in contact lenses respectively having two zones (curve a), four zones (curve b) and six zones (curve c)

FIG. 10 is a graph showing the variation of distance-to-optical zone area ratio, i.e., the ratio of the area of the distance-vision zones to that of the optical zone in contact lenses respectively having two zones (curve a), four zones (curve b) and six zones (curve c). It is desirable that the distant-to-optic area ratio remain as constant as possible regardless of the variation of the diameter of the pupil. As is obvious from FIG. 10, the distant-to-optic area ratios in the contact lenses respectively having four zones (curve b) and six zones (curve c) are relatively constant as compared with the distant-to-optic area ratio in the contact lens having two zones (curve a).

Since the contact lens of the present invention has the four zones, the variation of the area ratio between the distance-vision zones and the near-vision zones with the variation of the diameter of the pupil is very small.

As mentioned above, the first near-vision zone N1 is formed in a curve surrounded by a circle of a radius in the range of about 0.5 to about 1.0 mm having its center on the optical axis 10.

If the radius of the circle surrounding the first near-vision zone N1 is below 0.5 mm, the first near-vision zone N1 is excessively small and the interference of the light rays 22 traveled through the first distance-vision zone F1 with the image point K as shown in FIG. 3 cannot satisfactorily be avoided. Therefore, the radius of the circle surrounding the first near-vision zone N1 must be about 0.5 mm or above.

If the radius of the circle is greater than 1.0 mm, the first near-vision zone N1 is excessively large and the second near-vision zone N2 cannot be formed in an appropriate area relative to that of the first near-vision zone N1; that is, it is difficult to form the second near-vision zone N2 in a surface area five times that of the first near-vision zone N1 if the radius of the circle is greater than 1.0 mm. Therefore, the radius of the circle surrounding the first near-vision zone N1 must be about 1.0 mm or below.

Figure 11:
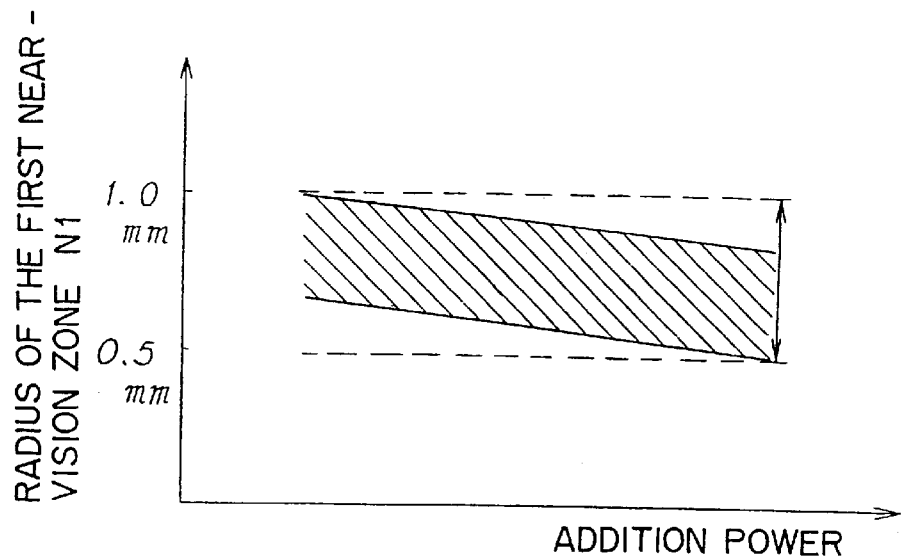
FIG. 11 is a graph showing the relation between a preferable range of the diameter of a first near-vision zone and addition power.
Figure 12:
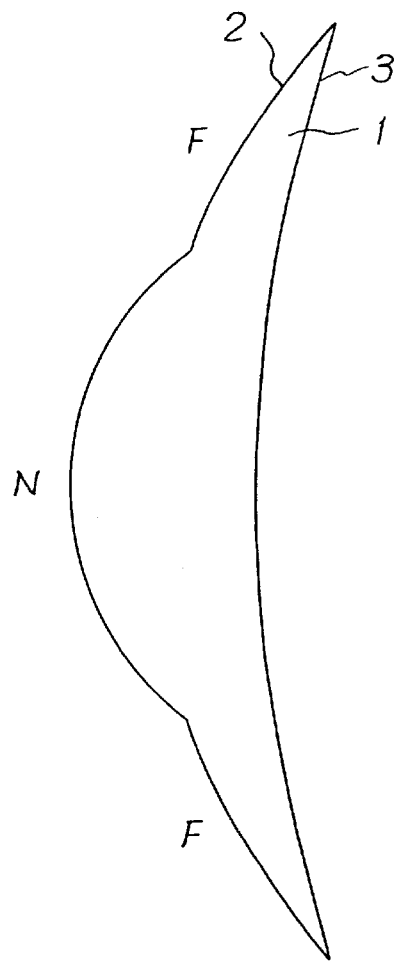
FIG. 12 is sectional view of a prior art concentric bifocal contact lens.
Figure 13:
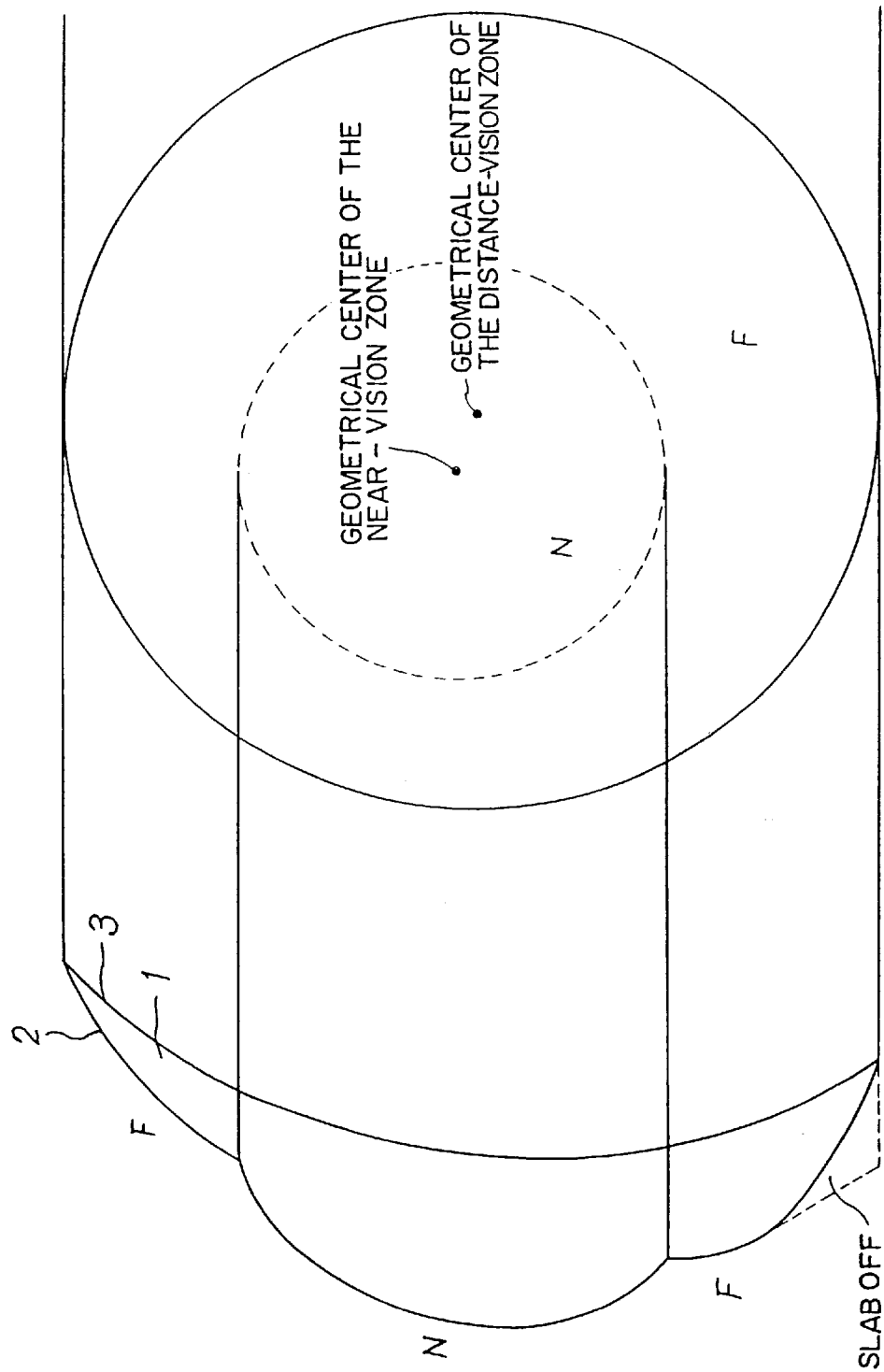
FIG. 13 is a sectional view of a prior art concentric, ballasted bifocal contact lens.
Figure 14:
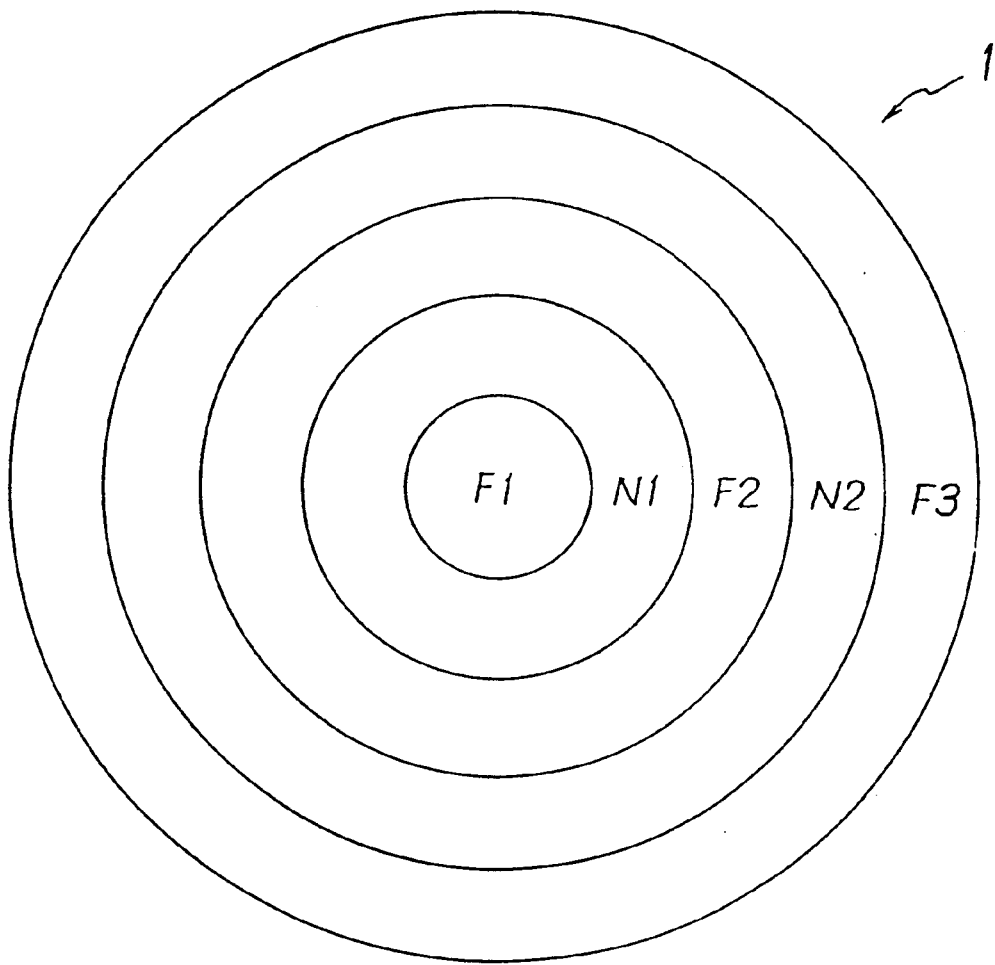
FIG. 14 is a sectional view of a prior art concentric bifocal contact lens provided with an alternate, concentric arrangement of distance-vision parts and near-vision parts.
Figure 15:
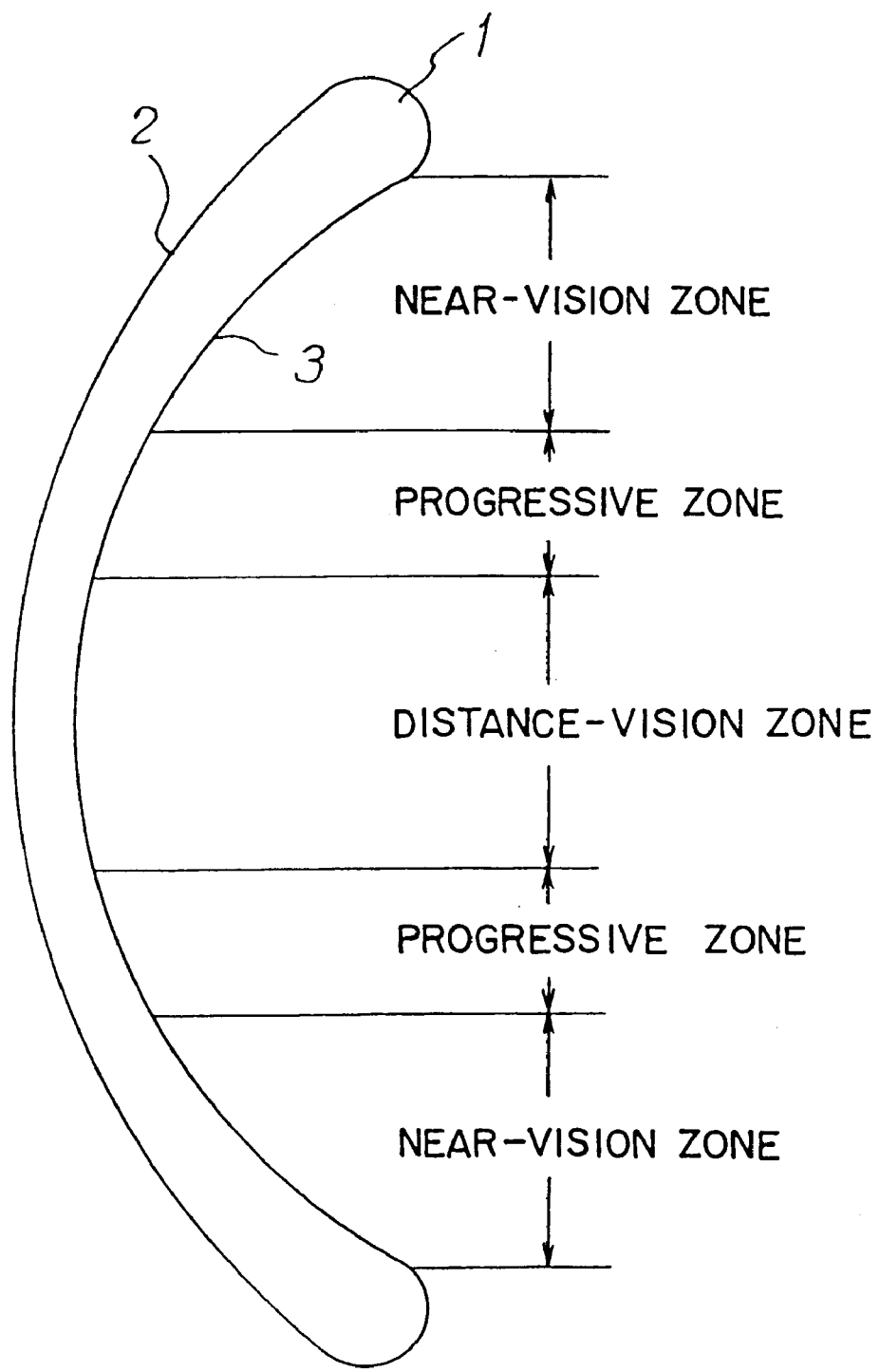
FIG. 15 is a sectional view of a prior art concentric progressively variable power multifocal contact lens.

More specifically, if the addition power is large when the radius of the circle surrounding the first near-vision zone N1 is in the range of about 0.5 to about 1.0 mm as shown in FIG. 11, i.e., if the distance between the focal point FF of the distance-vision zones F1 and F2, and the focal point FN of the near-vision zones N1 and N2 is long, the radius of the circle surrounding the first near-vision zone N1 may be nearer to 0.5 mm. In such a case, the diameter of the annular ring 24 shown in FIG. 3 is relatively great and interference can be avoided even if the radius of the circle surrounding the first near-vision zone N1 is relatively small. If the addition power is small, i.e., if the distance between the focal point FF of the distance-vision zones F1 and F2, and the focal point FN of the near-vision zones N1 and N2 is short, it is desirable that the radius of the circle surrounding the first near-vision zone N1 is nearer to 1.0 mm.

Although the foregoing description is made on an assumption that the near-vision zones and the distance-vision zones are formed on the front surface 2, i.e., a surface defiring a lens curve, the near-vision zones and the distance-vision zones may be formed on the base surface 3, i.e., a surface defining a lens curve.

What is claimed is:

1. A contact lens comprising a curved lens having a front convex surface and a rear concave surface, and an optical zone consisting of near-vision zones for correcting near vision and distance-vision zones for correcting distance vision, said near vision and distance vision zones being formed at said front surface, said rear surface being smooth and uncorrected for application to the eye of the user, said distance vision zones and said near-vision zones being individually arranged alternately with one another, and concentrically and coaxially with an optical axis of the lens;

wherein the near-vision zones and the distance-vision zones forming the optical zone of the lens are solely refractive and consist of a first near-vision zone including the optical axis, a first distance-vision zone surrounding and contiguous with the first near-vision zone, a second near-vision zone surrounding and contiguous with the first distance-vision zone, and a second distance-vision zone surrounding and contiguous with the second near-vision zone, the first near-vision zone being surrounded by a circle of a radius in the range of about 0.5 mm to about 1.0 mm and having its center on the optical axis, said radius of the circle being nearer to 0.5 mm for larger addition powers and being nearer to 1.0 mm for smaller addition powers;

said second near-vision zone having a surface area at least five times that of the first near-vision zone.

* * * * *